(12) United States Patent
Seltner et al.

(10) Patent No.: US 11,521,773 B2
(45) Date of Patent: Dec. 6, 2022

(54) PNEUMATIC SOLENOID VALVE

(71) Applicant: Conti Temic Microelectronic GmbH, Nuremberg (DE)

(72) Inventors: Norbert Seltner, Ingolstadt (DE); Stefan Buschmann, Ingolstadt (DE); Stefan Bauer, Engelbrechtsmünster (DE)

(73) Assignee: Conti Temic Microelectronic GmbH

( * ) Notice: Subject to any disclaimer, the term of this patent is extended or adjusted under 35 U.S.C. 154(b) by 896 days.

(21) Appl. No.: 16/392,938

(22) Filed: Apr. 24, 2019

(65) Prior Publication Data
US 2019/0333669 A1    Oct. 31, 2019

(30) Foreign Application Priority Data

Apr. 27, 2018 (DE) ..................... 10 2018 206 549.7

(51) Int. Cl.
*F16K 31/06* (2006.01)
*H01F 7/17* (2006.01)

(52) U.S. Cl.
CPC ........... *H01F 7/17* (2013.01); *F16K 31/0658* (2013.01); *F16K 31/0682* (2013.01)

(58) Field of Classification Search
CPC .... H01F 7/17; F16K 31/0658; F16K 31/0682; B60N 2/914
See application file for complete search history.

(56) References Cited

U.S. PATENT DOCUMENTS

| | | | |
|---|---|---|---|
| 5,709,370 A * | 1/1998 | Kah, Jr. | ............. F16K 31/0682 251/129.15 |
| 6,390,549 B1 | 5/2002 | Mayer et al. | |
| 7,070,162 B2 * | 7/2006 | Dzialakiewicz | .... F16K 31/0682 251/129.08 |
| 8,567,440 B2 | 10/2013 | Walter | |

(Continued)

FOREIGN PATENT DOCUMENTS

| CN | 102161321 A | 8/2011 |
|---|---|---|
| CN | 104145149 A | 11/2014 |

(Continued)

OTHER PUBLICATIONS

Chinese Office Action for Chinese Application No. 201910342771. 1, dated Sep. 3, 2020 with translation, 10 pages.

*Primary Examiner* — Umashankar Venkatesan
(74) *Attorney, Agent, or Firm* — RatnerPrestia

(57) ABSTRACT

A pneumatic solenoid valve includes a fluid connector, a magnet coil which extends along a coil axis, a yoke arranged on the magnet coil, and an armature movable relative to the yoke and which extends along an armature axis and which is formed for opening and closing the fluid connector. The armature can assume three different switching positions. In the first switching position, the armature and coil axes are arranged parallel to one another and the armature completely closes off the fluid connector. In the second switching position, the armature is rotated about an axis of rotation, such that the armature axis and the coil axis assume an angle with respect to one another and the armature partially opens the fluid connector. In the third switching position, the armature is in a state axially displaced in relation to the first switching position, such that the fluid connector is completely open.

16 Claims, 5 Drawing Sheets

(56) References Cited

U.S. PATENT DOCUMENTS

| | | | |
|---|---|---|---|
| 8,613,421 B2* | 12/2013 | Ams | F16K 31/10 |
| | | | 251/303 |
| 8,794,707 B2 | 8/2014 | Bocsanyi et al. | |
| 9,404,602 B2 | 8/2016 | Cebon et al. | |
| 9,631,737 B2* | 4/2017 | Brust | F16K 31/0682 |
| 9,677,683 B2 | 6/2017 | Hermansson | |
| 10,125,887 B2 | 11/2018 | Bürger et al. | |
| 10,766,391 B2* | 9/2020 | Buschmann | B60N 2/72 |
| 2002/0124891 A1 | 9/2002 | Frank et al. | |
| 2013/0200283 A1 | 8/2013 | Speer | |
| 2016/0265678 A1 | 9/2016 | Ye et al. | |
| 2018/0292019 A1 | 10/2018 | Beuschel et al. | |
| 2018/0301264 A1 | 10/2018 | Beuschel et al. | |
| 2021/0293346 A1* | 9/2021 | Sumino | A61B 5/0225 |

FOREIGN PATENT DOCUMENTS

| | | |
|---|---|---|
| CN | 106415097 A | 2/2017 |
| DE | 3018972 A1 | 11/1981 |
| DE | 19927403 A1 | 1/2001 |
| DE | 102008005586 A1 | 7/2009 |
| DE | 102013220557 A1 | 4/2015 |
| DE | 102016202137 A1 | 8/2017 |
| JP | 2017206041 A | 11/2017 |
| WO | 2015052194 A1 | 4/2015 |
| WO | 2017060082 A1 | 4/2017 |
| WO | 2017060090 A1 | 4/2017 |

* cited by examiner

PNEUMATIC SOLENOID VALVE

CROSS REFERENCE TO RELATED APPLICATION

This application claims priority to German Patent Application No. 10 2018 206 549.7, filed Apr. 27, 2018, the contents of such application being incorporated by reference herein.

FIELD OF THE INVENTION

The present invention relates to a pneumatic solenoid valve, and to an adjustment device for the adjustment of a contour of a seat bearing surface of a vehicle seat, which device has such a pneumatic solenoid valve.

BACKGROUND OF THE INVENTION

Pneumatic solenoid valves are used for controlling air flows in a multiplicity of technical fields of application. In these solenoid valves, a magnetic force is generated by means of a magnet coil and a switching process of the valve is triggered as a result. One area of application of such solenoid valves is the filling of elastic fluid chambers in an adjustment device for pneumatically adjusting a contour of a seat bearing surface (region of the seat surface or backrest) of a seat in a transportation means, such as for example a motor vehicle seat.

The pressure in the fluid chambers often has to be readjusted. On the one hand, this is necessary since leaks in the pneumatic system can lead to a pressure loss in the fluid chambers. On the other hand, it is necessary for the pressure in the fluid chamber to be continuously adapted or readjusted owing to changing local ambient conditions (temperature and/or pressure changes). Here, conventional pneumatic solenoid valves have the disadvantage that the solenoid valve either completely closes or completely opens the fluid connector. This leads to the fluid connector always being completely opened with each readjustment. The complete opening of the fluid connector results in an abrupt change in pressure in the interior of the solenoid valve, which manifests itself as a loud switching noise in the form of clicking, which is perceived as disturbing.

SUMMARY OF THE INVENTION

An aspect of the invention is a pneumatic solenoid valve which allows a low switching noise level with simultaneously improved regulation.

According to a first aspect of the present invention, a pneumatic solenoid valve, in particular a pneumatic solenoid valve for an adjustment device for the adjustment of a contour of a seat bearing surface of a vehicle seat, is provided. The pneumatic solenoid valve comprises a fluid connector, a magnet coil which extends along a coil axis, a yoke which is arranged on the magnet coil, and an armature which is movable relative to the yoke. The armature extends along an armature axis and is formed for opening and closing the fluid connector. The armature also assumes three different switching positions by application of three different electrical powers to the magnet coil or by electrical energization of the magnet coil with three different current intensities, wherein the armature may possibly also have yet further switching positions. In the first switching position, the armature axis and the coil axis are arranged parallel to one another and the armature completely closes off the fluid connector. Consequently, the pneumatic solenoid valve is in a closed position in which no fluid flow can flow into the interior of the valve. In the second switching position, the armature is in a state rotated about an axis of rotation, with the result that the armature axis and the coil axis assume an angle with respect to one another and the armature partially opens the fluid connector. Consequently, the pneumatic solenoid valve is in a partially open state, with the result that only a part of a maximally controllable fluid flow can flow into the interior of the valve. In the third switching position, the armature is finally in a state axially displaced in relation to the first switching position, with the result that the fluid connector is completely open. The pneumatic solenoid valve is thus in a completely open state. The designations "partially opened" and "partially open" describe a state in which the fluid connector has a degree of opening which is between completely open and completely closed. The fact that the armature only partially opens the fluid connector in the second switching position means that, during readjustment, the armature does not need to perform the complete stroke in each case. Moreover, owing to the relatively small fluid flow, only a slow change in pressure occurs in the interior of the pneumatic solenoid valve, whereby the switching noise of the valve is noticeably reduced. Since the solenoid valve according to an aspect of the invention additionally has the third switching position, in which the fluid connector is completely open as a result of the axial displacement of the armature, it is furthermore possible for the maximally controllable fluid flow of the valve to be provided in the usual manner. Consequently, it is possible for example for the fluid chamber to be inflated quickly and reliably in the usual manner.

In a preferred configuration of the pneumatic solenoid valve, in the third switching position, the armature is in a state rotated back, at least partially, through the rotation made into the second switching position. This ensures that, in the third switching position, the armature is again oriented parallel to the magnet coil.

In a further configuration, in the third switching position, the armature is in a state axially displaced along the coil axis. This ensures that the armature is displaced parallel to the magnet coil, whereby particularly good control of the armature is possible.

In a further configuration, a first electrical power is applied to the magnet coil in the first switching position, a second electrical power is applied to the magnet coil in the second switching position, and a third electrical power is applied to the magnet coil in the third switching position, wherein the first electrical power is smaller than the second electrical power and the second electrical power is smaller than the third electrical power. Preferably, the first electrical power has the value zero here, so that, in the first switching position, electrical power is not applied to the armature and the armature completely closes the fluid connector. In this way, a pneumatic NC solenoid valve (normally closed solenoid valve) is provided. Moreover, the second electrical power can be selected such that, in the second switching position, the armature opens the fluid connector by a predetermined or desired degree of opening, which is between completely open and completely closed. Here, the degree of opening of the fluid connector may be set according to the respective conditions by way of the second electrical power. Preferably, the second electrical power applied to the magnet coil is moreover proportional to the degree of opening of the fluid connector, with the result that, with the solenoid valve according to an aspect of the invention, a proportionally controllable solenoid valve is also provided.

According to a further configuration, the armature has a cylindrical body, which extends along the armature axis and which comprises a radially outer lateral surface in relation to the armature axis and an end surface which is arranged perpendicular to the lateral surface. Here, the designation "cylindrical body" encompasses both bodies with a circular end surface and bodies with other end surfaces, for example elliptical, quadrangular, rectangular or other expedient end surfaces. Furthermore, the yoke is arranged in relation to the armature such that, when an electrical power is applied to the magnet coil, a first magnetic force acts between the yoke and the lateral surface or a sub-region of the lateral surface. This allows the first magnetic force to rotate the armature about an axis of rotation, in particular an axis of rotation which is perpendicular to the armature axis, such that the fluid connector can be partially opened.

Furthermore, the pneumatic solenoid valve may have a core, which is connected to the yoke and which is arranged in relation to the armature such that, when an electrical power (which can be the same electrical power) is applied to the magnet coil, a second magnetic force acts between the core and the end surface, or a sub-region of the end surface, of the armature. In this way, the armature can be displaced along the armature axis.

Preferably, the armature, the yoke and the core are formed such that, in the second switching position, the first magnetic force is greater than the second magnetic force, with the result that the armature is rotated into the second switching position, and in the third switching position, the first magnetic force is smaller than second magnetic force, with the result that the armature is axially displaced from the second switching position to the third switching position. By way of this configuration, it is possible to provide in a simple manner a pneumatic solenoid valve in which the armature is both rotated and axially displaced.

In a further configuration, a gap is formed here between the yoke and the armature and is dimensioned such that the armature is able to be rotated about the axis of rotation in a predetermined angle range. The gap between the yoke and the armature makes it possible for the armature to have a certain degree of play with respect to the yoke, whereby the armature is able to be rotated and a degree of opening of the fluid connector is able to be set.

In a further configuration, the pneumatic solenoid valve also has a restoring element, which is arranged between the core and the armature and which is connected to the core and the armature and which pushes or preloads the armature into the first switching position. Consequently it is possible in a particularly simple manner to provide a pneumatic NC solenoid valve in which, in the first switching position, the armature completely closes the fluid connector without electrical power having to be applied to the magnet core.

In said configuration, it is preferably the case that, in the second switching position, the first magnetic force is greater than the second magnetic force minus the restoring force directed at the armature toward the first switching position by the restoring element, and in the third switching position, the first magnetic force is smaller than the second magnetic force minus said restoring force.

According to a further configuration, the pneumatic solenoid valve also has a valve housing which has the fluid connector, wherein the armature is arranged within the valve housing, and the yoke and the magnet coil are arranged outside the valve housing. For example, the valve housing may be a coil body of the magnet coil, which coil body bears the windings of the magnet coil. Here, the coil body is produced from a material which has a magnetic permeability with the value 1.

The solenoid valve according to an aspect of the invention can be provided for various application purposes. The solenoid valve according to an aspect of the invention preferably serves for the filling and/or emptying of at least one elastic fluid chamber in an adjustment device for pneumatically adjusting a contour of a seat bearing surface of a vehicle seat.

According to a second aspect of the present invention, an adjustment device for the adjustment of a contour of a seat bearing surface of a vehicle seat is therefore provided. In addition to a fluid chamber for the adjustment of the contour of the seat bearing surface, the adjustment device also comprises a pneumatic solenoid valve according to the first aspect or configurations thereof. Here, the fluid connector of the solenoid valve is a first fluid connector, which is preferably able to be connected to a fluid source which provides pressurized fluid. The solenoid valve may also have a second fluid connector, which is connected to the fluid chamber in order to fill the fluid chamber with fluid.

BRIEF DESCRIPTION OF THE DRAWINGS

Exemplary embodiments of aspects of the present invention will now be explained in more detail below with reference to the accompanying drawings, in which.

DETAILED DESCRIPTION OF THE PREFERRED EMBODIMENTS

Below, embodiments of aspects of the invention will be described on the basis of a pneumatic solenoid valve which is used for the filling and/or emptying of a fluid chamber in an adjustment device for the adjustment of a contour of a seat bearing surface of a vehicle seat. It goes without saying that the pneumatic solenoid valve may also be used for other usage purposes. By way of example, the embodiments of aspects of the invention will be explained using the example of a 2/2 NC solenoid valve. It goes without saying that, according to the application, the solenoid valve according to an aspect of the invention can also have a different number of fluid connectors and/or switching positions.

Figure 1:
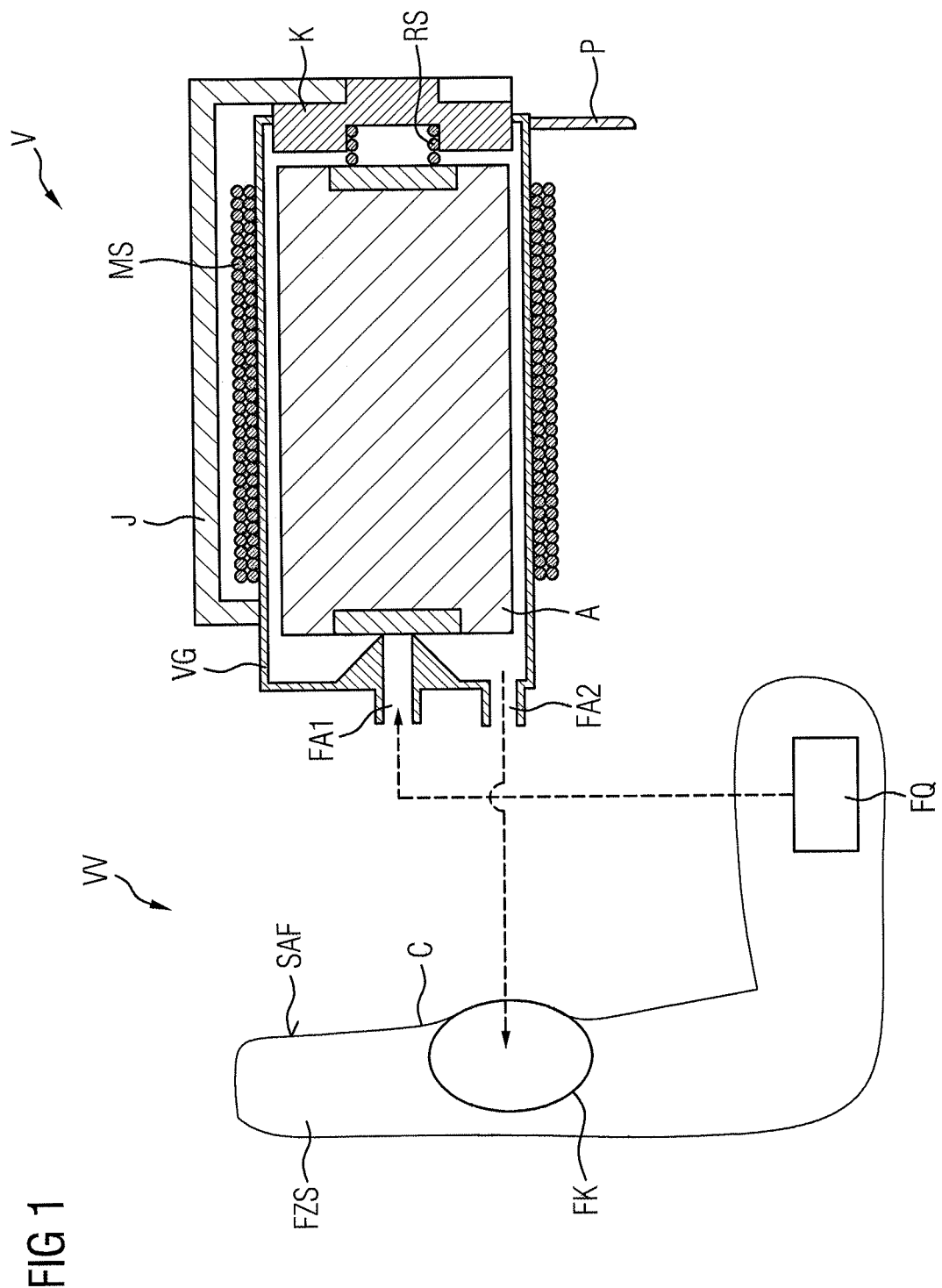
FIG. 1 shows a schematic view of a pneumatic solenoid valve according to an aspect of the invention, which is used by way of example in an adjustment device for the adjustment of a contour of a seat bearing surface of a vehicle seat.

Reference is firstly made to FIG. 1, which shows a schematic view of a pneumatic solenoid valve V. The solenoid valve V comprises a valve housing VG having multiple fluid connectors FA1, FA2, a magnet coil MS, a yoke 3 which is arranged on the magnet coil MS, an armature A which is arranged so as to be movable relative to the yoke 3, and a core K which is connected to the yoke 3 and which is arranged between the yoke 3 and the armature A.

The solenoid valve V further comprises an electrical contact P, which is electrically connected to the magnet coil MS such that electrical power or electrical current can be applied to the magnet coil MS. The yoke 3, the armature A and the core K are in this case produced from a material having good magnetic properties, such that, by application of electrical power to the magnet coil MS, it is possible to realize a magnetic flux from the armature A back to the armature A via the core K and the yoke J.

The application of electrical power to the magnet coil MS results in the armature A being moved relative to the yoke and the core K, and in the process allows said armature to open or close a first fluid connector FA1 of the solenoid valve V. In the specific example in FIG. 1, a restoring element RS is situated between the core K and the armature A, with the result that, without electrical power being applied to the magnet coil MS, the armature A closes the first fluid connector FA1 and, by application of electrical power to the magnet coil MS, the armature A opens the first fluid connector FA1, as will be described in more detail in conjunction with FIGS. 2 to 5.

In FIG. 1, the solenoid valve V is also shown as part of an adjustment device VV for the adjustment of a contour C of a seat bearing surface SAF of a vehicle seat FZS. The adjustment device VV has a fluid chamber FK, in particular an elastic fluid chamber FK, which can be filled with a pressurized fluid which is provided by a fluid source FQ. The filling of the fluid chamber FK results in the volume thereof being increased, whereby the contour C of the seat bearing surface SAF is able to be varied.

As is further illustrated in FIG. 1, the first fluid connector FA1 of the solenoid valve V is fluidically connected to the fluid source FQ. A second fluid connector FA2 of the solenoid valve V is fluidically connected to the fluid chamber FK. In order then to fill the fluid chamber FK with fluid, electrical power is applied to the magnet coil MS such that the armature opens the first fluid connector FA1. This allows pressurized fluid to flow from the fluid source FQ into the fluid chamber FK via the first fluid connector FA1 and the second fluid connector FA2 until a desired pressure prevails in the fluid chamber FK. If the desired pressure in the fluid chamber FK is subsequently to be maintained, then the supply of electrical power to the magnet coil MS is interrupted, whereby the armature A is, with the aid of the restoring element RS, moved back into its original position, in which the first fluid connector FA1 is closed.

There will now follow a more detailed discussion of the opening and closing of the fluid connector FA1 by means of the pneumatic solenoid valve V.

As has already been mentioned in conjunction with FIG. 1, the solenoid valve V has the magnet coil MS, the yoke J, the armature A and the core K. The solenoid valve V further has the valve housing VG, which has the fluid connectors FA1 and FA2. In the present case, the valve housing VG is the coil body of the magnet coil MS and bears the windings of the magnet coil MS. The coil body is produced from a material which has a magnetic permeability with the value 1, with the result that, when electrical power is applied to the magnet coil MS, a magnetic force can act between the yoke J and the armature A.

Here, the armature A is arranged in the interior of, or within, the valve housing VG, whereas the yoke J and the magnet coil MS are arranged outside the valve housing VG.

The valve housing VG is substantially cylindrical in form, with a left-hand side wall SWL, a right-hand side wall SWR and a cylinder wall ZW, which connects the left-hand side wall SWL and the right-hand side wall SWR. The left-hand side wall SWL comprises the first fluid connector FA1 and the second fluid connector FA2. The right-hand side wall SWR comprises the core K.

The magnet coil MS is arranged on the cylinder wall ZW and extends along a coil axis SA which extends substantially parallel to the cylinder wall ZW.

The armature A, which is arranged in the interior of the valve housing VG, has a cylindrical body ZK which extends along an armature axis AA. The cylindrical body ZK comprises a first end surface SF1, a second end surface SF2, which is opposite the first end surface SF1, and a lateral surface MF, which connects the first end surface SF1 and the second end surface SF2. In this case, the lateral surface MF is the radially outer surface of the cylindrical body ZK in relation to the armature axis AA.

The yoke J is arranged around the magnet coil MS. The yoke J is substantially U-shaped in form, with a first limb S1, which faces the lateral surface MF of the armature A, a second limb S2, which faces the second end surface SF2 of the armature A, and a connecting web VS, which connects the first limb S1 and the second limb S2. The second limb S2 of the yoke 3 is furthermore connected to the core K.

Figure 2:
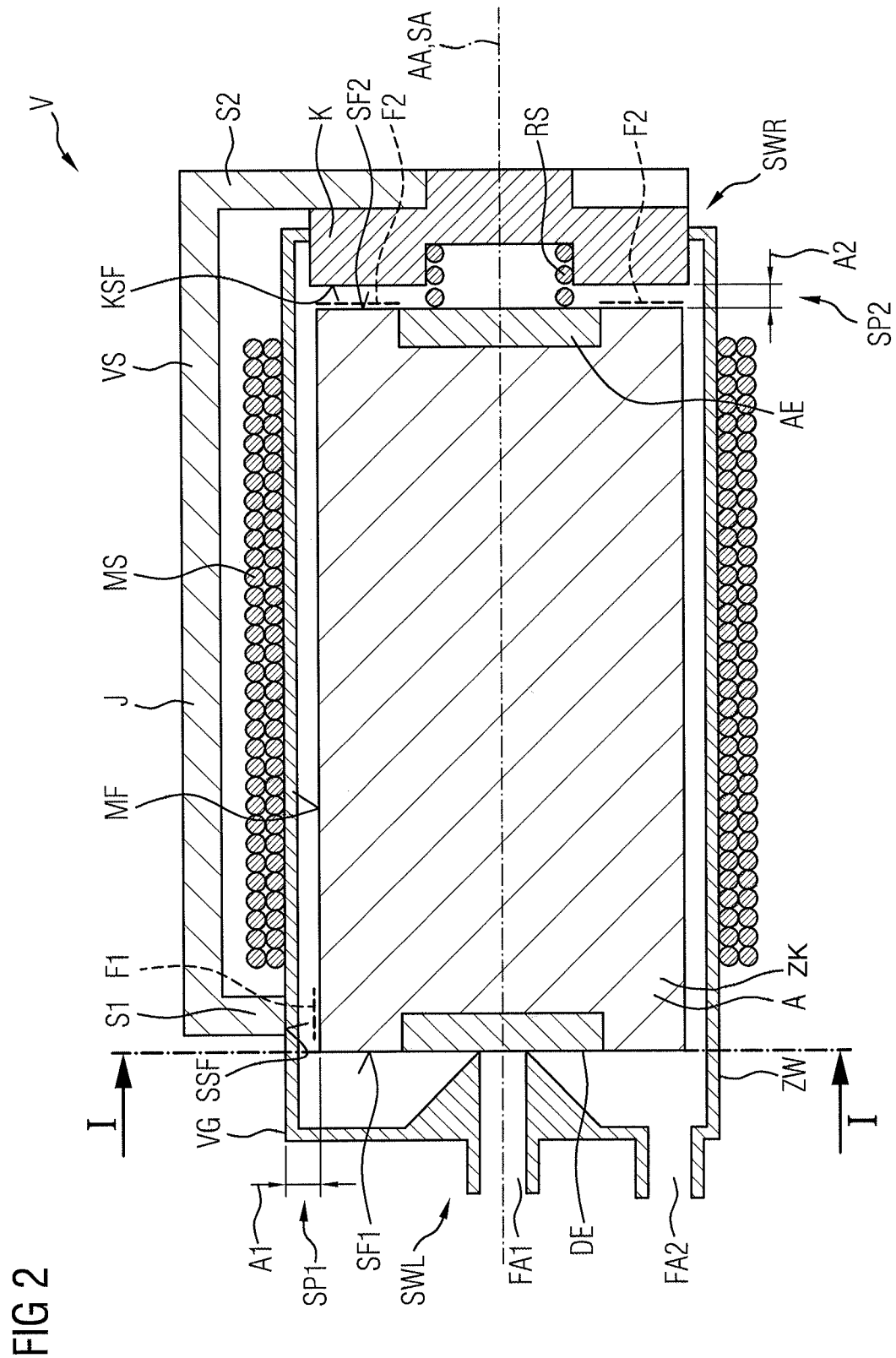
FIG. 2 shows a schematic view of a pneumatic solenoid valve according to an aspect of the invention, which has an armature which can assume three switching positions, with the armature being in the first switching position in FIG. 2.
Figure 4:
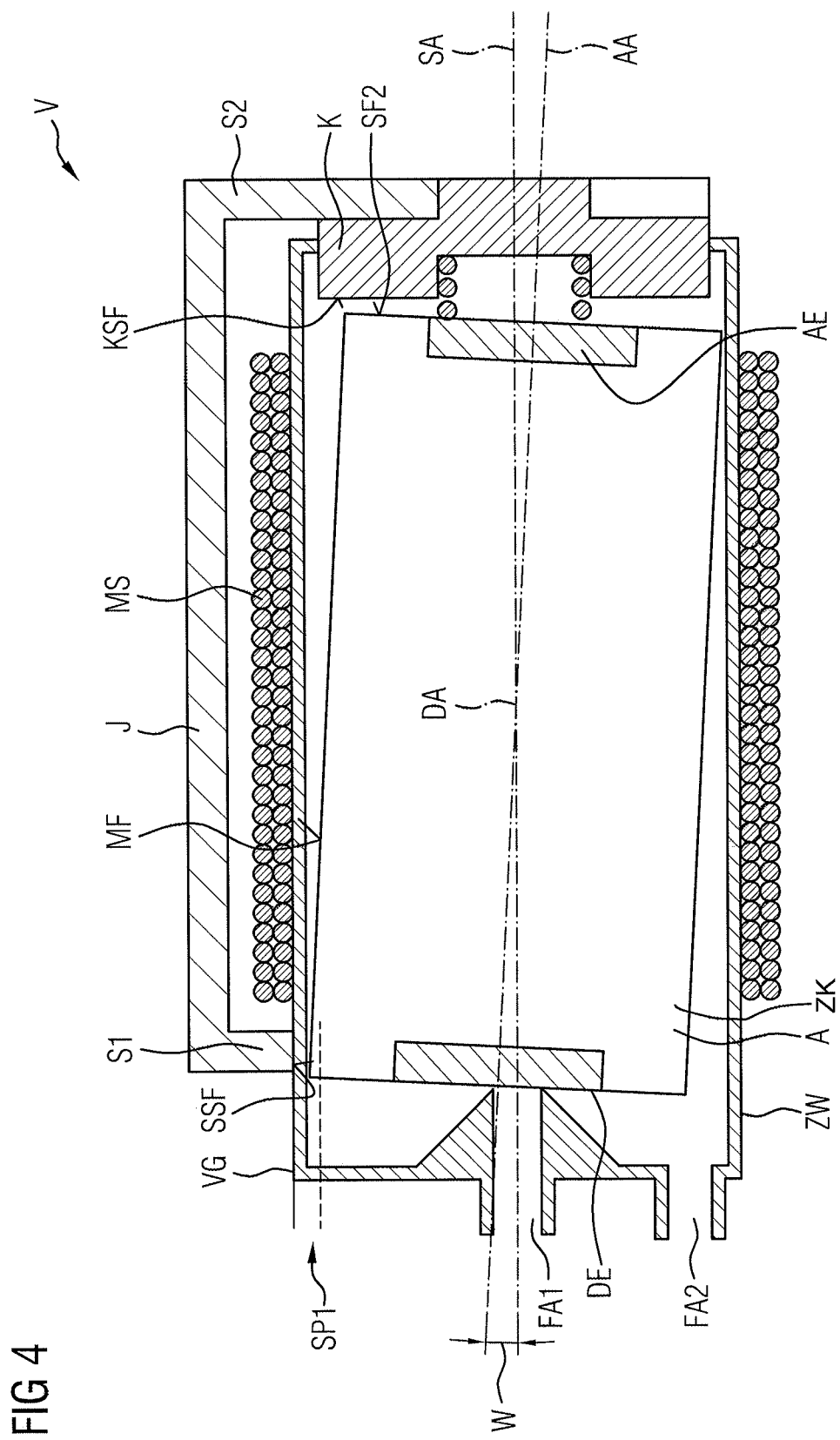
FIG. 4 shows a schematic view of a pneumatic solenoid valve according to an aspect of the invention, with the armature being in the second switching position.
Figure 5:
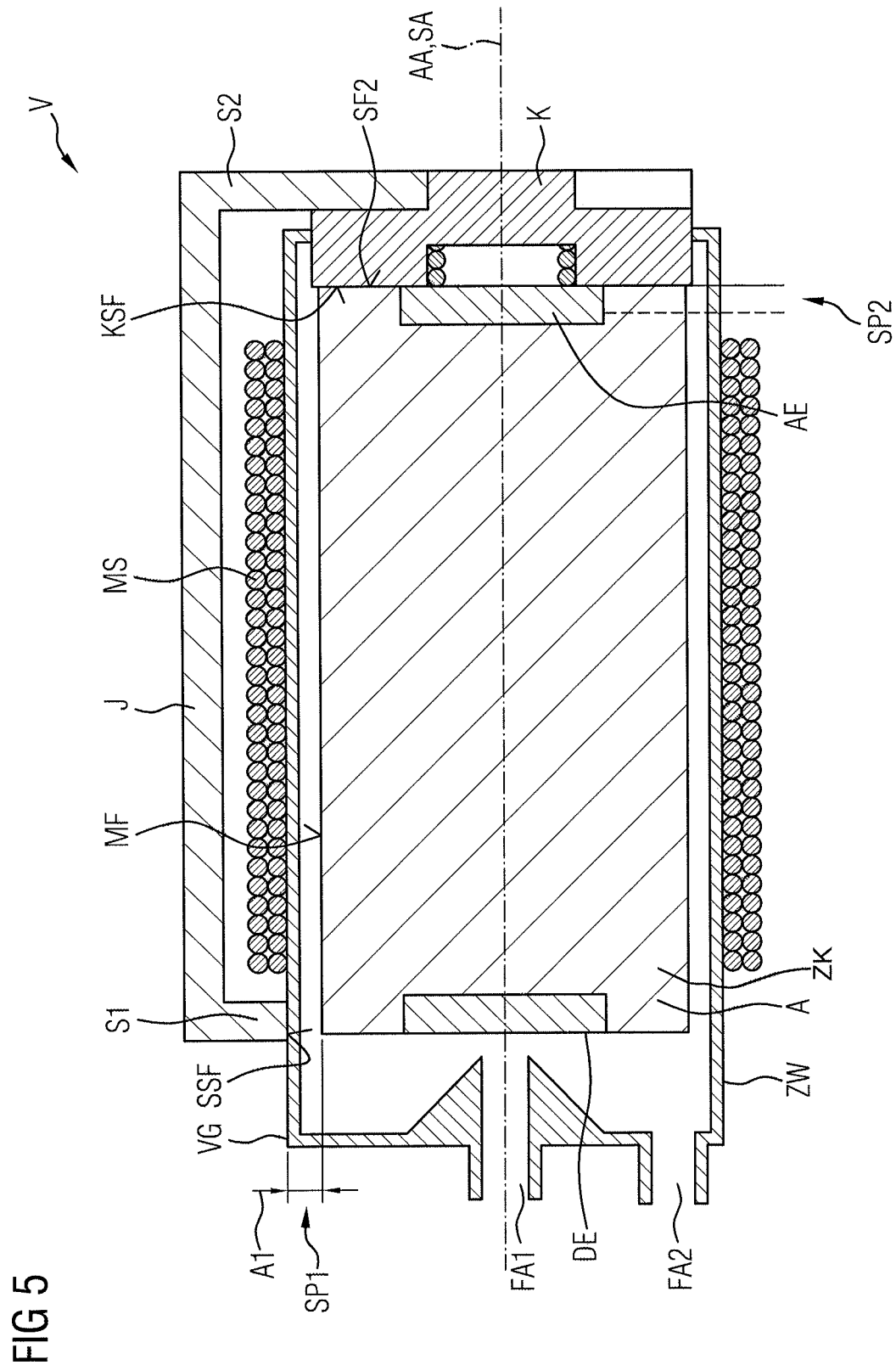
FIG. 5 shows a schematic view of a pneumatic solenoid valve according to an aspect of the invention, with the armature being in the third switching position.

The solenoid valve V is characterized in that the armature A can assume three different switching positions by application of three different electrical powers to the magnet coil MS, wherein FIG. 2 shows a first switching position of the armature A, FIG. 4 shows a second switching position of the armature A and FIG. 5 shows a third switching position of the armature A. With the aid of said three switching positions, the armature A is able to completely close the fluid connector FA1 in the first switching position (FIG. 2), to partially open the fluid connector FA1 in the second switching position (FIG. 4), and to completely open the fluid connector FA1 in the third switching position (FIG. 5).

As can be clearly seen in FIG. 2, in the first switching position, the armature A extends substantially parallel to the magnet coil MS, and so the armature axis AA and the coil axis SA are parallel. In fact, in the specific example in FIG. 2, the armature axis AA and the coil axis SA are identical.

In the first switching position of the armature A, the restoring force of the restoring element RS pushes the armature A against the sealing seat of the fluid connector FA1 such that the armature A, in particular the first end surface SF1 of the armature A, completely closes the fluid connector FA1. For this purpose, the first end surface SF1 has a sealing element DE. The sealing element DE may for example be an elastomer, which closes off the fluid connector FA1 at the sealing seat in an air-tight manner. Arranged on the second end surface SF2 of the armature A is a stop element AE, which is likewise in the form of an elastomer and which prevents the armature A from striking against the core K in the third switching position, as will be explained in more detail at a later stage in conjunction with FIG. 5.

As long as electrical power is not applied to the magnet coil MS, or a first electrical power which has the value zero is applied thereto, the restoring element RS pushes the armature against the sealing seat of the fluid connector FA1, with the result that the armature A is preloaded by the restoring element RS into the first switching position.

In the first switching position of the armature A, it is moreover the case that a first gap SP1 is formed between the lateral surface MF of the armature A and the yoke J, in particular between the lateral surface MF and a limb end surface SSF of the first limb S1 of the yoke 3, which gap establishes a first distance A1 between the limb end surface SSF and the lateral surface MF. Furthermore, a second gap SP2 is formed between the second end surface SF2 of the armature A and the core K, in particular between the second end surface SF2 and a core end surface KSF of the core K, which gap establishes a second distance A2 between the core end surface KSF and the second end surface SF2.

Application of a first electrical power to the magnet coil MS or application of a second electrical power to the magnet coil MS, which second electrical power is greater than the first electrical power, results in the generation of a first magnetic force between the yoke 3 and the lateral surface MF of the armature A and a second magnetic force between the core K and the second end surface SF2 of the armature A.

Here, the term "magnetic force" may be regarded as being the inverse of magnetic resistance. That is to say, the magnetic force is greater the smaller the magnetic resistance is. In other words, the magnetic force is indirectly proportional to the magnetic resistance, the magnetic resistance for its part being directly proportional to the quotient of the length of the magnetic circuit and the cross-sectional area of the conductor.

In the specific example in FIG. 2, the application of an electrical power (or a second electrical power, which is larger in comparison with the first electrical power) to the magnet coil MS leads to a first magnetic force acting between the limb end surface SSF and the lateral surface MF of the armature A, wherein said first magnetic force is indirectly proportional to the quotient of the length of the magnetic circuit, that is to say the first distance A1, and the cross-sectional area of the conductor, that is to say the area of a first surface F1 with which the limb end surface SSF covers the lateral surface MF. Regarding the distance A1, it should be noted that the magnetic permeability of the valve housing VG with a value of 1 leads to the distance A1 which is relevant for the design being the actual distance between the limb end surface SSF and the lateral surface MF of the armature A and not the distance between a lateral inner surface of the valve housing VG and the lateral surface MF of the armature A.

Figure 3:
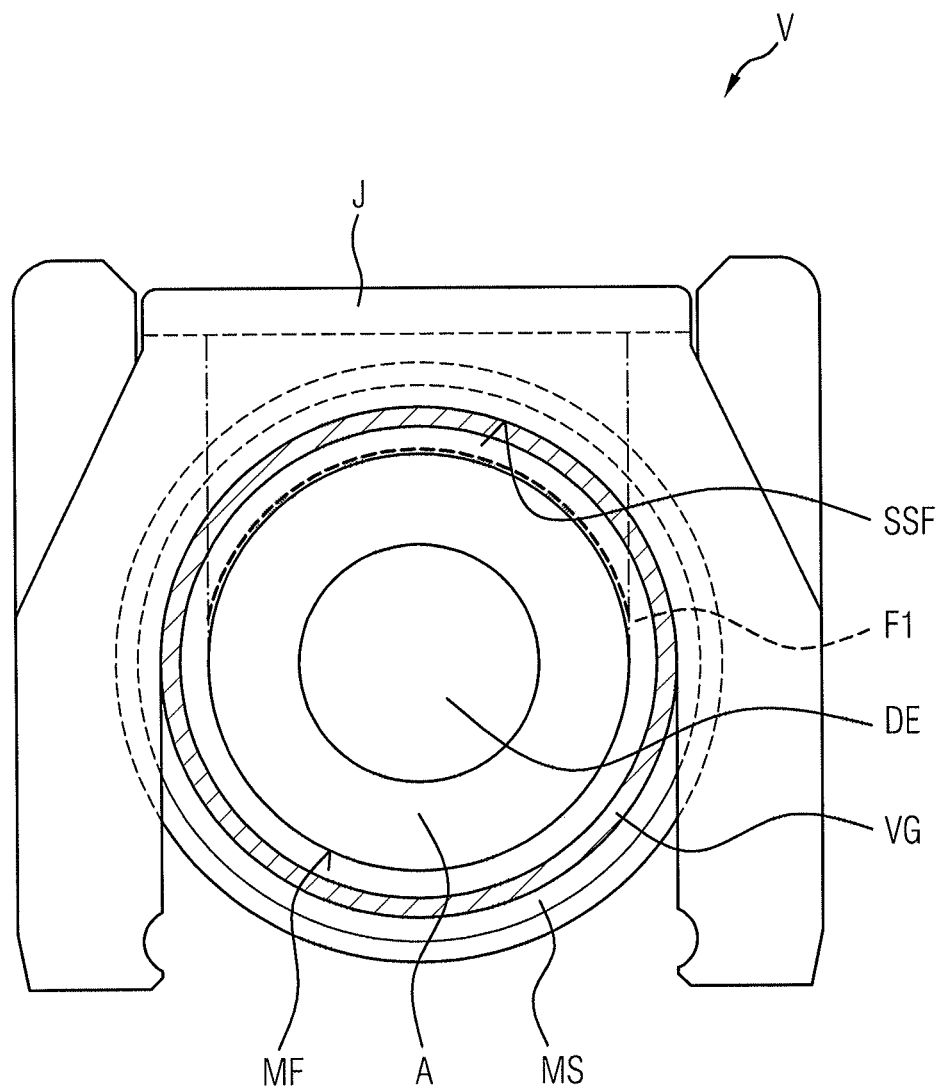
FIG. 3 shows a schematic sectional view along the line I-I in FIG. 2, in which a sub-region of a lateral surface of the armature is additionally highlighted.

For better illustration of the first surface F1, reference is made to FIG. 3, which shows a schematic sectional view of the pneumatic solenoid valve V along the line I-I in FIG. 2. It becomes clear from FIG. 3 that the first surface F1 is that sub-region of the lateral surface MF with which the limb end surface SSF covers the lateral surface MF. This is indicated by the vertical dash-dotted lines.

In the specific example in FIG. 2, the application of the electrical power (or the second electrical power) to the magnet coil MS also leads to a second magnetic force acting between the core end surface KSF and the second end surface SF2 of the armature A, wherein said second magnetic force is indirectly proportional to the quotient of the length of the magnetic circuit, that is to say the second distance A2, and the cross-sectional area of the conductor, that is to say the area of a second surface F2 with which the core end surface KSF covers the second end surface SF2 of the armature A. In the specific example in FIG. 2, the second surface F2 is an annular surface of the second end surface SF2.

The yoke J, or the first limb S1 thereof, the core K and the armature A are then formed such that, during the application of electrical power (or the second electrical power) to the magnet core, the first magnetic force, which acts between the yoke 3 (or the limb end surface SSF thereof) and the lateral surface MF of the armature A, is greater than the second magnetic force, which acts between the core K (or the core end surface KSF thereof) and the second end surface SF2 of the armature A. The fact that, during the application of the second electrical power to the magnet coil MS, the first magnetic force is greater than the second magnetic force means that rotation of the armature A about an axis of rotation DA occurs. Consequently, the armature A is moved from the first switching position into a second switching position.

With the design, it should be taken into account that the restoring element RS exerts a restoring force on the armature A toward the first switching position. The second magnetic force is reduced by said restoring force. In the second switching position, it therefore has to be ensured that the first magnetic force is always greater than the second magnetic force minus the restoring force of the restoring element RS.

Reference is now made to FIG. 4, in which the second switching position of the armature A is schematically illustrated.

As can be seen, in the second switching position of the armature A, the armature axis AA has an angle W with respect to the coil axis SA. The rotation of the armature A about the axis of rotation DA results in the fluid connector FA1 being partially opened, with the result that the pressurized fluid can enter the interior of the valve housing. At the same time, however, not the entire cross section of the fluid connector FA1 is opened up, and so not the entire stroke of the solenoid valve V or of the armature A has to be performed. Since it is the case that not the entire stroke of the armature A has to be performed, firstly, not the fluid flow which is maximally controllable by the solenoid valve V enters the valve housing VG, as a result of which a relatively slow change in pressure occurs in the interior of the valve housing VG. Secondly, the reduced stroke also avoids the situation in which the armature A exerts an impulse on the valve housing VG, as a result of which no body-borne sound is transmitted to the valve housing VG. Consequently, valve-switching noise can be substantially avoided.

The second electrical power may furthermore be set such that the armature A is rotated through a predetermined angle W. This allows a degree of opening of the fluid connector FA1, which is between completely open and completely closed, to be set. Since the rotation of the armature A is also proportional to the second electrical power applied to the magnet coil MS, it is also possible for the solenoid valve V to be activated in a proportional manner, whereby the degree of opening is able to be adapted to the respective conditions even more easily.

As can further be seen in FIG. 4, rotation of the armature A leads to a gap between the lateral surface MF of the armature A and the limb end surface SSF being reduced. This is schematically shown by the armature A "entering" the first gap SP1, which gap is present in the first switching position. In order to allow rotation of the armature A in a desired angle range, it is necessary for the first gap SP1 between the limb end surface SSF and the lateral surface MF to be sufficiently large. With the design of the first gap SP1, the thickness of the cylinder wall ZW of the valve housing VG must however be taken into account.

The rotation of the armature A about the axis of rotation DA leads to a gap between the second end surface SF2 of the armature A and the core end surface KSF being changed. Due to the change of the gap between the limb end surface SSF and the lateral surface MF and due to the change of the gap between the core end surface KSF and the second end surface SF2, a force ratio between the first magnetic force and the second magnetic force is established in a manner dependent on the second electrical power applied to the magnet coil MS, which results in the position of the armature A. The yoke 3, or the first limb S1 thereof, the core K and the armature A are moreover formed such that, during the application of a third electrical power (also being able to be referred to as switching or threshold power), which exceeds the second electrical power, to the magnet coil MS, the force ratio between the first magnetic force and the second magnetic force is inverted and the second magnetic force is greater than the first magnetic force. This leads to the situation in which, during the application of the third electrical power to the magnet coil MS, the armature A no longer rotates toward the limb end surface SSF but is axially displaced in the direction toward the core end surface KSF. In other words, the armature A strives to close the gap between the second end surface SF2 and the core end surface KSF. In this way, the armature A assumes a third switching position.

With the design, the restoring force, pushing the armature A toward the first switching position, of the restoring element RS should again be taken into account. In the third switching position, it therefore has to be ensured that the second magnetic force is always greater than the first magnetic force plus the restoring force.

Reference is now made to FIG. 5, in which the third switching position of the armature A is schematically illustrated.

As can be seen, the armature A is in an axially displaced state, in particular in a state axially displaced along the coil axis SA. The axial displacement of the armature A leads to the armature A now completely opening the fluid connector FA1 in the third switching position. Consequently, it is possible for the maximally controllable fluid flow to enter the valve housing VG. As can also be seen, in the third switching position, the armature A is not only in an axially displaced state but also in a state rotated back through the rotation made into the second switching position. The rotating-back is realized in that the reduction of the gap between the second end surface SF2 and the core end surface KSF generates a magnetic force which is much greater than the first magnetic force between the limb end surface SSF and the lateral surface MF. The rotating-back of the armature A in the third switching position has the result that the armature axis AA and the coil axis SA are again parallel to one another and the first distance A1 between the lateral surface MF of the armature A and the limb end surface SSF of the yoke J is re-established.

According to configuration, however, in the third switching position, it is also possible for the armature A only to be in an axially displaced state, without being in a rotated back state. In the third position, it is also possible for the armature A merely to be in a state rotated back, at least partially, through the rotation made into the second switching position.

As has already been mentioned, the second end surface SF2 has the stop element AE, which is in the form of an elastomer. If the third electrical power is then applied to the magnet coil MS, the armature A is moved toward the core end surface KSF until the stop element AE makes contact with the core end surface KSF. Since the stop element AE is in the form of an elastomer, the stop element AE at the same time dampens the impact of the armature A against the core end surface KSF such that virtually no body-borne sound is transmitted from the armature A to the core K.

As soon as the first electrical power (or no electrical power) is applied again to the magnet coil MS, the armature A is moved once more to the first fluid connector FA1 such that the armature A assumes the first switching position and the sealing element DE is able to close the first fluid connector FA1 in an air-tight manner.

With the present pneumatic solenoid valve V, it is possible to provide a proportionally activatable pneumatic solenoid valve which allows a low switching noise level with simultaneously improved regulation.

Although, by way of example, embodiments of aspects of the invention have been explained using the example of a 2/2 NC solenoid valve, it goes with saying that, according to the application, it is also possible for the solenoid valve according to an aspect of the invention to have a different number of fluid connectors and/or switching positions. For example, the solenoid valve according to an aspect of the invention may be designed in the form of a 3/3 NC solenoid valve or in the form of a 3/2 NO solenoid valve. A 3/2 NO solenoid valve may be obtained for example in that the core K has a third fluid connector, which is connected to the surroundings and is opened by the armature A in the first switching position and closed by said armature in the third switching position.

The invention claimed is:

1. A pneumatic solenoid valve comprising:
   a fluid connector;
   a magnet coil which extends along a coil axis;
   a yoke which is arranged on the magnet coil;
   a core, which is connected to the yoke;
   an armature which is movable relative to the yoke and which extends along an armature axis and which is formed for opening and closing the fluid connector; and
   a restoring element, which is arranged between the core and the armature and which is connected to the core and the armature and which preloads the armature into the first switching position,
   wherein the armature can assume three different switching positions by application of three different electrical powers to the magnet coil, wherein,
   in a first switching position, the armature axis and the coil axis are arranged parallel to one another and the armature completely closes off the fluid connector,
   in a second switching position, the armature is in a state rotated about an axis of rotation, with the result that the armature axis and the coil axis assume an angle with respect to one another and the armature partially opens the fluid connector, and
   in a third switching position, the armature is in a state axially displaced in relation to the first switching position, with the result that the fluid connector is completely open.

2. The pneumatic solenoid valve as claimed in claim 1, wherein, in the third switching position, the armature is in a state rotated back, at least partially, through the rotation made into the second switching position.

3. The pneumatic solenoid valve as claimed in claim 2, wherein, in the third switching position, the armature is in a state axially displaced along the coil axis in relation to the first switching position.

4. The pneumatic solenoid valve as claimed in claim 1, wherein, in the third switching position, the armature is in a state axially displaced along the coil axis in relation to the first switching position.

5. The pneumatic solenoid valve as claimed in claim 1, wherein the pneumatic solenoid valve also has a valve housing which has the fluid connector, and the armature is arranged within the valve housing, and the yoke and the magnet coil are arranged outside the valve housing.

6. An adjustment device for adjustment of a contour of a seat bearing surface of a vehicle seat, comprising:
a fluid chamber for the adjustment of the contour of the seat bearing surface, and
a pneumatic solenoid valve as claimed in claim 1, wherein the fluid connector is a first fluid connector, which is able to be connected to a fluid source, and the pneumatic solenoid valve also has a second fluid connector, which is connected to the fluid chamber.

7. A pneumatic solenoid valve comprising:
a fluid connector,
a magnet coil which extends along a coil axis;
a yoke which is arranged on the magnet coil; and
an armature which is movable relative to the yoke and which extends along an armature axis and which is formed for opening and closing the fluid connector,
wherein the armature can assume three different switching positions by application of three different electrical powers to the magnet coil, wherein,
in a first switching position, the armature axis and the coil axis are arranged parallel to one another and the armature completely closes off the fluid connector,
in a second switching position, the armature is in a state rotated about an axis of rotation, with the result that the armature axis and the coil axis assume an angle with respect to one another and the armature partially opens the fluid connector, and
in a third switching position, the armature is in a state axially displaced in relation to the first switching position, with the result that the fluid connector is completely open, and
wherein a first electrical power is applied to the magnet coil in the first switching position, a second electrical power is applied to the magnet coil in the second switching position, and a third electrical power is applied to the magnet coil in the third switching position, wherein the first electrical power is smaller than the second electrical power and the second electrical power is smaller than the third electrical power.

8. The pneumatic solenoid valve as claimed in claim 7, wherein the first electrical power has a zero value.

9. The pneumatic solenoid valve as claimed in claim 8, wherein the second electrical power is selected such that, in the second switching position, the armature opens the fluid connector by a predetermined degree of opening, which is between completely open and completely closed.

10. The pneumatic solenoid valve as claimed in claim 7, wherein the second electrical power is selected such that, in the second switching position, the armature opens the fluid connector by a predetermined degree of opening, which is between completely open and completely closed.

11. A pneumatic solenoid valve comprising:
a fluid connector;
a magnet coil which extends along a coil axis;
a yoke which is arranged on the magnet coil, and
an armature which is movable relative to the yoke and which extends along an armature axis and which is formed for opening and closing the fluid connector,
wherein the armature can assume three different switching positions by application of three different electrical powers to the magnet coil, wherein,
in a first switching position, the armature axis and the coil axis are arranged parallel to one another and the armature completely closes off the fluid connector,
in a second switching position, the armature is in a state rotated about an axis of rotation, with the result that the armature axis and the coil axis assume an angle with respect to one another and the armature partially opens the fluid connector, and
in a third switching position, the armature is in a state axially displaced in relation to the first switching position, with the result that the fluid connector is completely open, and
wherein the armature has a cylindrical body, which extends along the armature axis and which has a lateral surface and an end surface which is arranged perpendicular to the lateral surface, and the yoke is arranged in relation to the armature such that, when an electrical power is applied to the magnet coil, a first magnetic force acts between the yoke and the lateral surface.

12. The pneumatic solenoid valve as claimed in claim 11, wherein the pneumatic solenoid valve also has a core, which is connected to the yoke, and the core is arranged in relation to the armature such that, when an electrical power is applied to the magnet coil, a second magnetic force acts between the core and the end surface of the armature.

13. The pneumatic solenoid valve as claimed in claim 12, wherein the armature, the yoke and the core are formed such that, in the second switching position, the first magnetic force is greater than the second magnetic force, with the result that the armature is rotated, and in the third switching position, the first magnetic force is smaller than second magnetic force, with the result that the armature is axially displaced.

14. The pneumatic solenoid valve as claimed in claim 11, wherein a gap is formed between the yoke and the armature and is dimensioned such that the armature is able to be rotated about the axis of rotation in a predetermined angle range such that a degree of opening of the fluid connector is able to be set.

15. The pneumatic solenoid valve as claimed in claim 11, wherein the pneumatic solenoid valve also has a restoring element, which is arranged between the core and the armature and which is connected to the core and the armature and which preloads the armature into the first switching position.

16. A pneumatic solenoid valve comprising:
a fluid connector;
a magnet coil which extends along a coil axis;
a yoke which is arranged on the magnet coil;
an armature which is movable relative to the yoke and which extends along an armature axis and which is formed for opening and closing the fluid connector; and
a sealing element disposed in an end surface of the armature,
wherein the armature can assume three different switching positions by application of three different electrical powers to the magnet coil, wherein,
in a first switching position, the armature axis and the coil axis are arranged parallel to one another and the armature completely closes off the fluid connector,
in a second switching position, the armature is in a state rotated about an axis of rotation, with the result that the armature axis and the coil axis assume an angle with respect to one another and the armature partially opens the fluid connector, and
in a third switching position, the armature is in a state axially displaced in relation to the first switching position, with the result that the fluid connector is completely open.

* * * * *